March 16, 1965 C. L. HANSEN 3,173,222
LINE ATTACHING DEVICE
Filed Nov. 14, 1962
FIG. 1
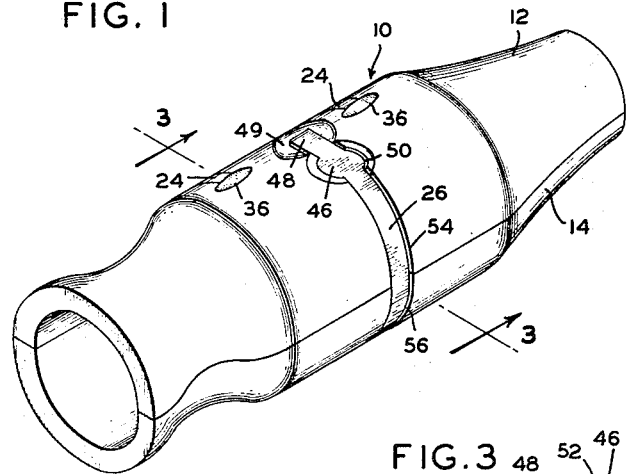
FIG. 6
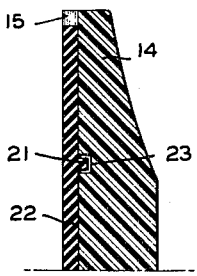
FIG. 2
FIG. 3
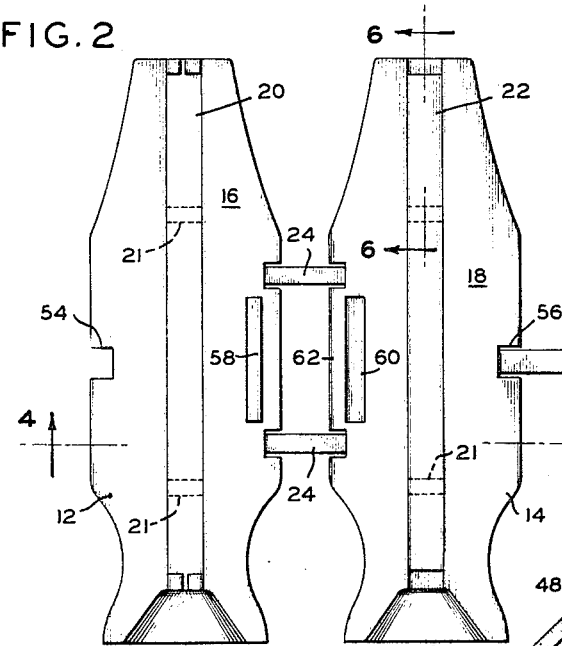
FIG. 7
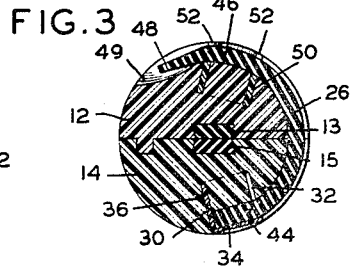
FIG. 5
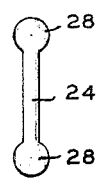
FIG. 4
INVENTOR
CHRISTIE L. HANSEN
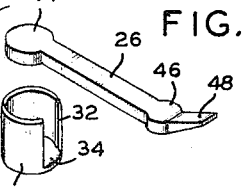
ATTORNEYS

United States Patent Office 3,173,222
Patented Mar. 16, 1965

3,173,222
LINE ATTACHING DEVICE
Christie L. Hansen, P.O. Box 12, Port Sulphur, La.
Filed Nov. 14, 1962, Ser. No. 237,457
11 Claims. (Cl. 43—44.91)

The present invention relates to a device to be removably secured to a line, and more particularly to a float or bob to be secured to a fishing line.

The present invention is an improvement on the float device disclosed in United States Patent No. 3,019,546, and relates to an improved hinge and latch structure used to connect together separable sections of a float.

The instant device comprises a pair of separable sections having facing inner walls between which a line is adapted to be firmly gripped. The sections are pivotally connected together by a pair of elongated elastic hinge members whose opposite ends are firmly connected to the respective sections. The sections are selectively latched together by an elongated elastic latch member, one end of which is firmly connected to one section and the other end of which is detachably connected to the other section. When the hinge members and the latch member are connected to both sections of the float, at least one of the elastic elements is in a stretched condition, thereby tending to maintain the facing walls of the section in firm, line gripping position. In the preferred embodiment, the two sections are buoyant, being formed, for example, of expandable polystyrene.

One of the objects of this invention is to provide a device to be removably secured to a line in a positive gripping relation with said line, without the need for cutting, crimping, twisting or bending the line.

Another object of this invention is to provide a hinge connection between two abutting, separable members that tends to maintain said members in non-abutting relationship with one another.

A further object of this invention is to provide two abutting, hingedly interconnected members with means adapted to maintain said members in gripping relation with lines of varying thickness.

Still a further object of this invention is to provide a hinge construction that provides for both pivotal interconnection of members and resilient interconnection of said members.

An added object of this invention is to provide a latch means for resiliently interconnecting separable members.

These and further objects of the invention will be more readily apparent from the following detailed description and drawings, wherein:

FIGURE 1 is a perspective view of one embodiment of the invention, particularly as applied to a fishing float;

FIGURE 2 is a plan view of the inside of the float of FIGURE 1, in open condition;

FIGURE 3 is a cross section on line 3—3 of FIGURE 1;

FIGURE 4 is a cross section taken on the line 4—4 of FIGURE 2, except that the float is only partially opened;

FIGURE 5 is an exploded perspective view of a latch means used in the invention;

FIGURE 6 is a cross section taken on line 6—6 of FIGURE 2, and

FIGURE 7 is a plan view of one of the hinges by which the sections are hinged together.

Referring to the drawing, wherein like or corresponding parts throughout the several views are designated by like reference numerals, an embodiment of the instant invention comprises a float 10 formed of two separable sections 12 and 14. The sections 12 and 14 have facing or abutting inner walls 16 and 18, respectively.

The float 10 may be made of any material buoyant in water, as for example, cellular polystyrene, wood, etc.

Each of the float sections 12 and 14 has a groove 13 and 15, respectively, in its inner face within which is fitted elongated line gripping members 20 and 22, respectively. The line gripping elements are substantially the same as elements 28 and 35, respectively, of the aforementioned United States Patent No. 3,019,546, and function in the same manner. Line gripping members 20 and 22 differ from those shown in said patent only insofar as they are secured to the float sections. Each member 20 and 22 is provided on the bottom thereof with a transverse rib 21 which fits into a corresponding recess 23 on the inner walls of the walls 16 and 18 (see FIG. 6). These transverse ribs prevent longitudinal sliding of the line gripping members 20 and 22. The line gripping members are also kept in their respective grooves mechanically in a sort of dovetail like arrangement, since grooves 13 and 15 are wider near their bottom and the line gripping members are similarly shaped.

The sections 12 and 14 are hingedly connected together by a pair of hinge members 24, and held in closed condition, as shown in FIGS. 1 and 3, by a latch member 26. In a preferred construction, the hinge members 24 and the latch member 26 are each formed of a flexible, elastic material such as rubber, either natural or synthetic, or any material that is flexible and capable of being stretched beyond its normal length, and returning to normal length after the stretching force is removed.

Each of the hinge elements 24 is a flat, rubber strip substantially longer than it is wide, and at each end there is a laterally enlarged portion or end knob that is substantially the same thickness as the remainder of element 24.

Stated differently, element 24 may be considered as having the shape of a flat dumbbell.

One end knob 28 of each hinge member 24 is seated within a recess in the outer surface of one of the sections and the other end knob 28 is seated within a recess in the outer surface of the other section. In the illustrated embodiment, instead of each knob being seated directly in the corresponding recess, each end knob is seated within a hollow, cup-shaped bushing having a longitudinal slot 32 formed in the wall thereof. Each end slot 32 extends from the open end of the bushing to the closed end 34 of the bushing. Each bushing is fitted in the corresponding recess of each section with the open end of the bushing being directed toward the inside of the section and with the closed end 34 being adjacent the outer surface of the section. The narrow portion of each hinge member 24 extends from the respective end knobs 28 through the slot 32 in the respective cup-shaped bushings 30 (FIGURE 4). Each bushing 30 is of substantially greater length than the thickness of each end knob 28.

Each hinge member 24 has the bushing 30 on one end thereof seated in a recess 36 formed in the outside of one of the sections of the float, and the bushing at the other end of the hinge member seated in a like recess 36 in the other section of the float. Each bushing is deeply enough embedded in its recess 36 to place the closed end 34 of the bushing substantially flush with the surface of the respective float section. Each recess has an upwardly concentric post 38 integral with the float section, and extending into the bushing to contact the inner face of the end knob 28 within that particular bushing.

When the float sections are closed, as shown in FIGURE 1, the narrow, central portion of each hinge member 24 is removably seated in aligned grooves 40 and 42 formed in the float sections 12 and 14, respectively. Each of the grooves 40 and 42 interesects the slot 32 in the bushing 30 mounted in the respective float sections.

To maintain the instant float in closed condition (FIGURES 1 and 3), the float is provided with the latch member 26. The latch member 26 is flexible and elastic being formed of either the same or similar material as the hinge members 24. At one end of the latch member is a lateral enlargement or knob 44, similar to the enlargements 28 on the hinge members 24. Adjacent the opposite end of the latch member, there is another laterally enlarged portion, or latching knob 46 having a pull tab 48 extending therefrom.

The enlargement or knob 44 on the latch member fits within one of the above described, cup-shaped bushings 30 in the same manner that the knobs on the ends of the hinge members do. The bushing 30 that retains the knob 44 is seated in a recess 36 in the section 14 and is identical to the recesses 36 in which the hinge member retaining bushings are seated, thereby retaining one end of the latch member 26 connected to the float section 14.

The knob 46 at the opposite end of the latch 26 extends toward the other float section 12 and is removably seated in a bushing 50 which is open at both ends and seated in the section 12 (FIGURE 3). The bushing 50 has diametrical slots 52 in its side wall, adjacent the outer end of the bushing. A portion of the latch member 26 extends through one slot 52, and the pull tab 48 through the other slot 52.

The central, narrowest portion of the latch 26 is in a pair of aligned grooves 54 and 56 in the outer surface of the sections 12 and 14 when the latch is fastened to both sections in the manner shown in FIGURES 1 and 3.

It is emphasized that when the float is closed, the distance between the bushings 30 and 50, along the bottom of the grooves 54 and 56, is less than the unstretched length of the latch 26 between the knobs 44 and 46. In addition, the distance between the centers of bushings 30 at the opposite ends of each hinge member 24, when the float is closed (FIGURE 1), is less than the distance between the centers of the knobs 28 on each hinge member. Thus, when the float is closed, and latched, both of the hinge members 24, and the latch member 26, are in stretched condition, thereby creating a positive pressure between the inner faces 16 and 18, and between the line gripping elements 20 and 22.

Furthermore, when the knob 46 on the latch member is removed from the bushing 50, the tension in the hinge members 24 tends to pull the float sections apart, to essentially the position shown in FIGURE 4. This feature of the invention expedites removal from or adjustment of the float on a line.

In order to insure proper alignment of the sections 12 and 14 upon closure thereof about a line, one of the sections, for example, section 12, is provided with an upwardly extending rib 58 on its inner face 16, adjacent that edge of said face nearest the section 14, and said section 14 is provided with a groove 60 in its inner face 18. When the sections are closed together, the rib 58 fits into the groove 60, in the manner shown in FIGURE 3.

It is pointed out that the rib 58 serves another function. When the float is opened, it has a tendency to take the position shown in FIGURE 4, with one side edge 62 of section 14 substantially in abutment with one side of the rib 58. Upon commencing to close the float, the aforementioned edge 62 and the side of the rib act as a fulcrum between the float sections 12 and 14, and greatly expedite rapid closure of the float. The elements of the sections are so proportioned that the rib 58 naturally tends to enter the groove 60 upon closure of the float.

As will be seen in FIGURE 4, the side edge 62 of section 14 between the hinge members 24, and in alignment with rib 58, is curved or arcuate to facilitate closing the device to bring the line gripping elements into abutting relationship.

In the illustrated embodiment of the invention, the sections are made of cellular polystyrene. In order to form these sections out of cellular polystyrene, the sections are molded from expandable polystyrene beads, and during the molding operation the beads expand, as is well known in the art, to fill the molding cavity and to adhere the expandable beads to each other. Cellular polystyrene, as used in the illustrated embodiment, is rather soft, and because of this, the recesses in the sections must be strong enough to support the knobs during constant usage. It is for this reason that in the illustrated embodiment, the bushings are used. The bushings are formed of relatively rigid material and are seated deeply in the sections so that the knobs of the hinged and the one knob of the latch are normally fixed or secured to the sections. The utilization of the bushings to fix the ends of the hinges and the one end of the latch serves another function in that in the event the elastic members need to be replaced, the bushings can easily be removed to permit the insertion of a new elastic strip. The bushings are so sized that they are snugly held within the sections.

In the event that the material from which the float is made is sufficiently strong to keep the knobs in position, the bushings may be eliminated (not shown).

The hinge members and latch members are preferably made of rubber, such as neoprene, and the hardness or the elasticity of the rubber can be selected, as desired, depending upon whether it is desired to have a tighter or looser connection between the members.

Preferably, the hinge members and the latch member are of such a thickness that they are substantially flush with the outer surface of the float.

In FIGURE 2, the float is shown with the inner surfaces 16 and 18 lying in substantially a single plane. However, normally, when the knob 46 on the latch is removed from its bushing, the resiliency of the hinge members opens the float to about the position shown in FIGURE 4, wherein the inner surfaces of the sections are at an angle to each other in the neighborhood of about 90°.

FIGURE 5 shows in exploded form the relationship between the knob 44 and the bushing 30 at one end of the latch member. The knobs on the hinge members are similarly assembled.

As shown in FIGS. 4 and 5, the latch member 26 is substantially straight or flat except for the tab 48. In other words, as shown in these figures the latch 26 substantially lies in one plane. When the float is assembled the hinge members as well as the latch members are flat or straight. Of course, after the float has been used awhile, both the latch member and the hinge member may ultimately take on a permanent curve or bend. The pull tab 48 is at an angle of approximately 45 degrees to the plane of the latch member 26 so that when the float is in the closed position, as shown in FIGS. 1 and 3, the tab is positioned in a recess 49 in the outer surface of section 12.

By mounting the hinges and latches as indicated herein and by fitting the line gripping elements in their respective grooves as described herein, each of these parts can be readily replaced in the event they wear out.

Reference has previously been made to FIG. 2 as showing the float in the open position. In actual use of the float, when the latch is released, it assumes the position of approximately that as shown in FIG. 4. However, the float can be completely opened so that the inner walls of both sections lie in the same plane, this is the position shown in FIG. 2.

It will be appreciated that in FIG. 4 which shows the position the float normally takes when open, the hinges 24 are substantially straight and are in the relaxed position. When the float is opened to the extent shown in FIG. 2 the elasticity of the hinges will tend to bring the sections to the position shown in FIG. 4.

In actual use when the float is put on the line, the small end is facing the hook, with the larger cupped shaped end facing upward or toward the fishing pole.

I claim:

1. A device to be removably secured to a line comprising a pair of separable sections having facing inner walls, said sections being hingedly secured together by hinge means so that said sections can be positioned with the inner walls substantially abutting each other, representing the closed position of the device, and so that the sections can be separated to an open position, wherein the walls do not abut each other, said hinge means comprising flexible elastic means including at least one elongated elastic member having laterally enlarged portions along its length, said laterally enlarged portions being substantially coplanar with said elastic member, each of the sections having a recess on the outer side thereof, one of said enlarged portions being seated within a recess of one of the sections and the other of said enlarged portions being seated within a recess of the other section, said elastic member being under tension when the device is in the closed position.

2. A device according to claim 1, wherein each section is provided with a circumferential groove in its outer surface, said groove extending from said recess to the edge of the section, the groove in one section being aligned with the groove in the other section, each of the grooves communicating with its respective recesses, the portion of the elongated elastic member between said enlarged portions being seated in said grooves and being substantially flush with the outer surface of said device.

3. A device according to claim 2, further including a hollow bushing in each of said recesses, each bushing having at least a portion of its outer surface in abutment with the wall of said recess, each of said enlarged portions of the elongated elastic member being located within one of said bushings.

4. A device as set forth in claim 3, wherein each bushing has an opening formed in the wall thereof and in alignment with the groove that intersects the recess within which it is mounted.

5. A float device to be removably secured to a line comprising a pair of separable buoyant sections having facing walls, each of said sections having a plurality of recesses formed in the outer surface thereof, an inverted cup-shaped bushing in each recess, the closed end of said bushing being spaced from the bottom of said recess, a plurality of elongated, flexible hinge members, each hinge member having a laterally enlarged portion adjacent each end, each laterally enlarged portion being substantially coplanar with said hinge member, one enlarged portion of a respective hinge member being mounted within a bushing in one of the separable sections beneath the closed end of said bushing, and the other enlarged portion of the same hinge member being mounted within a bushing in the other section, beneath the closed end of said bushing, whereby said sections are hingedly connected together.

6. A float device as set forth in claim 5, wherein each of said hinge elements is elastic.

7. A float device as set forth in claim 6, wherein each bushing has an opening formed in the side wall thereof, and the elongated hinge member associated therewith extends through said opening.

8. A float device according to claim 7, including an elongated flexible latch member having a laterally enlarged portion adjacent each end, said enlarged portions being substantially coplanar with said latch member, one of said enlarged portions being affixed to one of said separable sections, and the other of said enlarged portions being removably attached to the other of said separable sections.

9. A float device as set forth in claim 8 wherein said latch member is elastic.

10. A device according to claim 9, wherein one of said facing walls has a protuberent portion near the edge and extending from said wall, the other of said walls having a recess formed therein near the edge to receive said protuberent portion.

11. A device according to claim 1, including an elongated flexible latch member having a first end and a second end, said latch member having a first laterally enlarged portion adjacent said first end and a second laterally enlarged portion spaced inwardly from said second end so that the free end of said latch member beyond said second enlarged portion provides a tab, each of said enlarged portions being substantially coplanar with said latch member, each of said sections having an additional recess on the outer side thereof, said first enlarged portion being seated within one of said additional recesses and said second enlarged portion being removably received within the other of said additional recesses to releasably maintain the device in the closed position.

References Cited by the Examiner
UNITED STATES PATENTS

| | | | |
|---|---|---|---|
| 1,240,043 | 9/17 | Gregory et al. | 43—44.92 X |
| 2,241,851 | 5/41 | Gilstrap | 43—44.9 |
| 2,377,717 | 6/45 | Reilly | 220—31 |
| 2,526,129 | 10/50 | Groesbeck et al. | 16—150 |
| 2,892,220 | 6/59 | Gillespie | 16—150 |
| 2,978,020 | 4/61 | Paulsrude | 16—150 |
| 3,019,546 | 2/62 | Hansen | 43—44.91 |

SAMUEL KOREN, *Primary Examiner.*

ABRAHAM G. STONE, *Examiner.*